Figure 3:
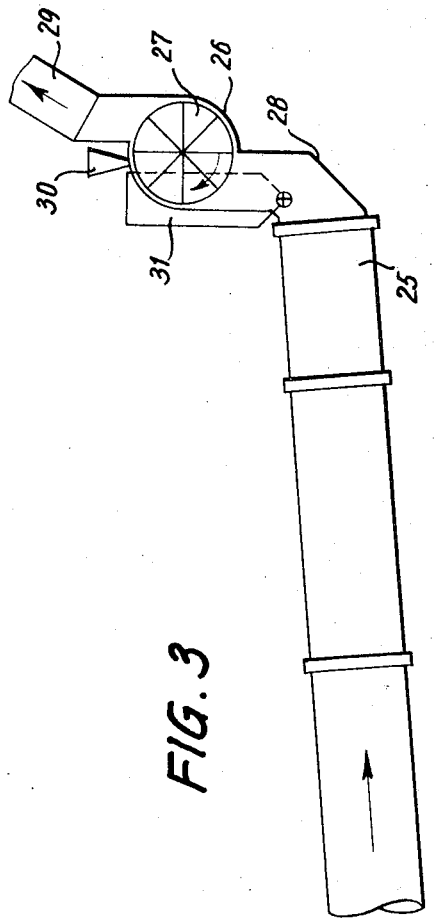

United States Patent [19]

Damgaard-Iversen et al.

[11] 3,776,688
[45] Dec. 4, 1973

[54] METHOD FOR OPERATING A ROTATING KILN PLANT FOR THE PRODUCTION OF CEMENT AS WELL AS A PLANT FOR CARRYING OUT THE METHOD

[75] Inventors: Jorgen Damgaard-Iversen, Birkerod; Flemming Kruse, Farum, both of Denmark

[73] Assignee: Aktieselskabet Niro Atomizer, Gladsaxevej, Soborg, Denmark

[22] Filed: June 29, 1972

[21] Appl. No.: 267,722

Related U.S. Application Data

[63] Continuation of Ser. No. 77,929, Oct. 5, 1970, abandoned.

[52] U.S. Cl. .................................................. 432/14
[51] Int. Cl. ............................................. F27b 7/02
[58] Field of Search ......................... 432/14, 58, 106

[56] References Cited
UNITED STATES PATENTS

| | | |
|---|---|---|
| 2,687,290 | 8/1954 | Garovtte et al. .................... 106/100 |
| 3,507,482 | 4/1970 | Kraszewski et al. ................ 102/100 |
| 3,526,483 | 9/1970 | Devssner et al. ...................... 23/284 |
| 3,623,236 | 11/1971 | Zacpal et al. ........................... 432/58 |

*Primary Examiner*—John J. Camby
*Attorney*—Sughrue, Rothwell, Mion, Zinn & MacPeak

[57] ABSTRACT

The operation of a rotating kiln plant for producing cement according to the wet process the capacity of the kiln is increased and the heat economy is improved by drying a part of the cement slurry in a spray drier and introducing the spray-dried material into the kiln in the transition between the drying zone and the calcining zone of the latter. The sum of the quantity of slurry which is spray-dried and the quantity introduced in normal way at the inlet of the kiln plant is 120–300 percent by weight of the normal capacity of the kiln. The spray drying is performed using exhaust gas from a rotating kiln, which may be the same as that in which the spray-dried material is introduced.

14 Claims, 4 Drawing Figures

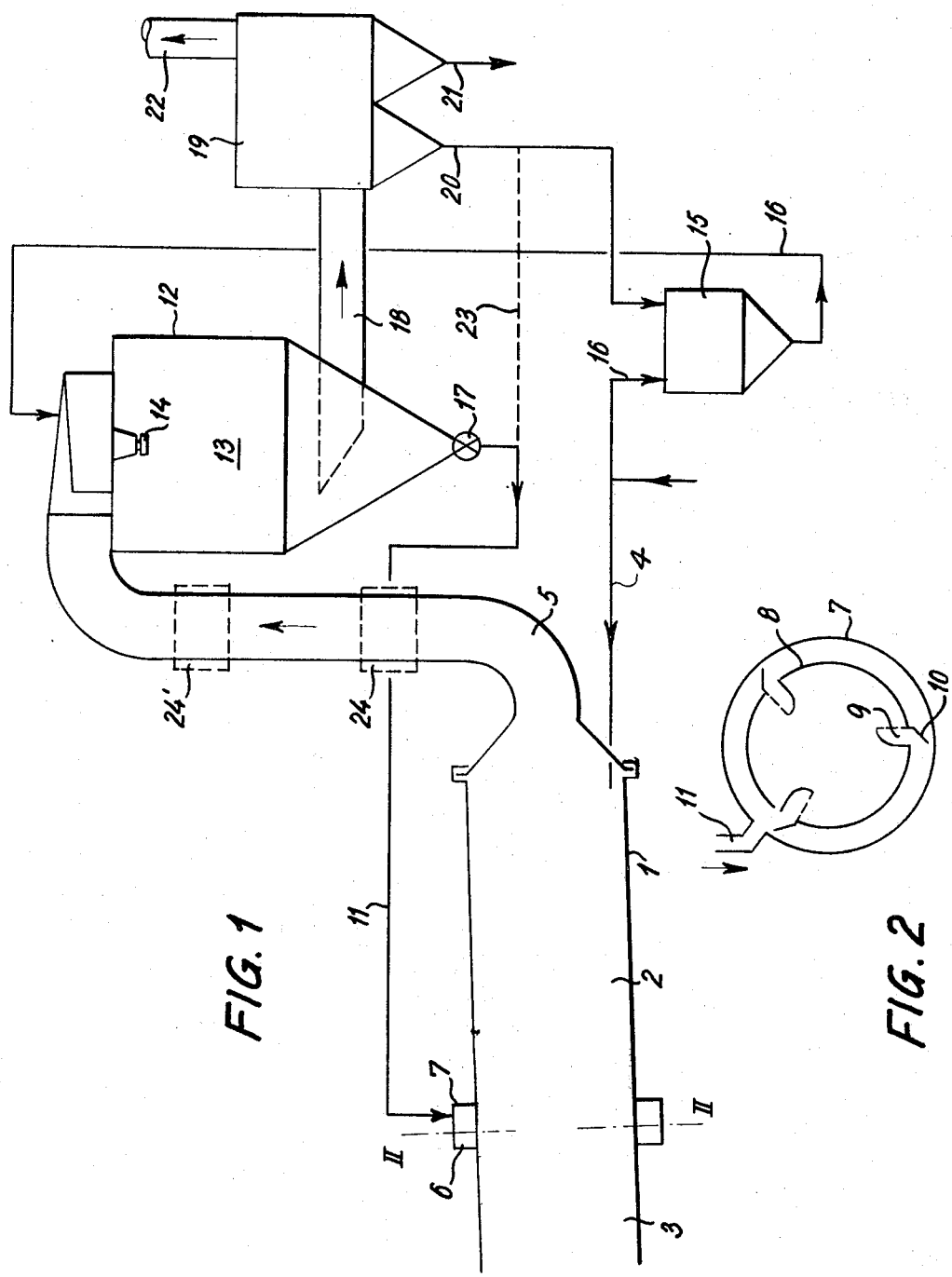

METHOD FOR OPERATING A ROTATING KILN PLANT FOR THE PRODUCTION OF CEMENT AS WELL AS A PLANT FOR CARRYING OUT THE METHOD

This is a continuation, of application Ser. No. 77,929, filed Oct. 5, 1970, now abandoned.

The invention relates to a method for operating a rotating kiln plant of the type used for producing cement according to the wet process, where cement slurry is introduced at one end in counterflow with gas which is introduced at the opposite end, where the clinker produced in the kiln are removed after the material in the kiln has been subjected to a drying, a calcining and a sintering in three successive zones. The first of these zones, viz. the drying zone, may be constituted by a separate kiln unit which is connected with the calcining and sintering kiln and from which the partially dried slurry drops down into the latter.

It is a result of the development that the conventional rotating kiln plants of the type referred to above have become uneconomic to operate, and consequently several such kilns, which are out of action or which are only in an emergency used as a capacity reserve, lie idle, the demand for cement often increasing to a higher degree than it is possible to equip the factories with modern material which is more economic to operate.

The present invention is based on the recognition that it is possible in a comparatively simple and inexpensive way to modify the operation so that at the same time an increase in the capacity of the kiln and an improvement of the heat economy are achieved.

According to the invention this is done in the way that besides the quantity of cement slurry, which is in the normal way introduced at the inlet end of the kiln plant in a quantity corresponding to 20-100 percent by weight of the normal operation capacity of the plant, an additional quantity of cement slurry is taken so that the sum of this quantity and the quantity introduced at the inlet end of the kiln plant has a value of from about 120 percent by weight to about 300 percent by weight of the quantity corresponding to the normal operation capacity of the kiln, the said additional quantity of cement slurry being subjected to a spray drying by means of exhaust gas from a rotary kiln plant, which may be identical with that mentioned above, after which the spray-dried product is introduced into the kiln in the transition between the drying zone and the calcining zone of the latter.

It has turned out that besides a very essential increase in the capacity it is possible to achieve a considerable improvement of the heat economy, in certain cases even as high as up to 50 percent. A further advantage of the method according to the invention is that a particularly high weight per liter clinker is obtained by the introduction of the dry powder from the spray drying apparatus into the still slightly moist slurry material leaving the drying zone of the rotary kiln plant.

By an advantageous way of realizing the method according to the invention a mechanical dehydration of the additional quantity of cement slurry to a content of dry matter of up to 70-75 percent by weight is performed before the spray drying, which is preferably effected by means of a centrifugal atomizer. By this means are obtained in part a smaller consumption of heat due to the fact that the quantity of water to be evaporated is smaller, in part an increased slurry treatment capacity for a spray drying plant having a given water evaporation capacity.

A particularly great increase in capacity and a good heat economy may be achieved by a way of carrying out the method which according to the invention is characterized in that before being introduced into the kiln the spray-dried product is preheated by means of the exhaust gas from the kiln, before the said gas is used for the spray drying.

The invention furthermore relates to a plant for carrying out the said method by means of an ordinary rotating kiln, possibly comprising a separate drying zone, for the production of cement according to the wet process and with the possibility of introducing powdered material into the transition between drying zone and calcining zone. The feature that according to the invention is characteristic of this plant is that at the transition between drying zone and calcining zone the kiln is connected to a spray drying plant of such a size that its capacity expressed in weight of dried product per unit of time is at least 20 percent and preferably over 100 percent of the capacity of the kiln expressed in weight of dry matter supplied per unit of time at normal operation.

In comparison with the increase in capacity and the improvement of the heat economy achieved, the connection of a spray drying plant is not very expensive, so that the investment in the plant will very soon be recovered through the improved economy.

In the following the invention will be explained in more detail with reference to the drawing where FIG. 1 schematically shows an embodiment of the plant according to the invention, FIG. 2 a detail of the plant in section on line II—II in FIG. 1, FIG. 3 part of the plant in a modified embodiment, and FIG. 4 a side elevation of the part shown in FIG. 3.

In the drawing, the upper end of a conventional rotating kiln 1 is shown, viz. the end comprising the drying zone 2 of the kiln, the so-called chain section, and the succeeding calcining zone 3, only part of which is shown, however. The remaining part of the kiln with the sintering zone and the firing equipment of the latter is not shown in the drawing.

4 designates the ordinary supply line for cement slurry of the kiln, and 5 designates the exhaust discharge aperture of the kiln.

As is frequently the case, the kiln is constructed with means 6 for introducing powdered material into the range of transition from the drying zone to the calcining zone. The latter consists of a shell 7, FIG. 2, surrounding a belt 8 of the kiln in which a number of apertures 9 are provided, there being in connection with each of these apertures 9 mounted a vane or bucket 10 projecting into the space between the shell 7 and the wall of the kiln. The shell 7 is stationary and is sealed around the wall of the kiln. Powdered material can be introduced through an inlet 11 which leads to the space between the shell 7 and the wall of the kiln, and during the rotation of the kiln the vanes 10 will collect the powdered material introduced and convey it through the apertures 9 into the kiln.

In the known plants with such powder introduction means, the latter serve for the introduction of dust separated from the exhaust gas from the kiln and from ventilating plants in connection with cement packing rooms and storage rooms or on the whole from all places where cement dust accumulates in connection with the production.

According to the present invention, the powder supply means are, however, used for a quite different purpose as will appear more clearly below.

In connection with the rotating kiln, a spray drying plant 12 has been mounted consisting of a drying chamber 13 with a rotating atomizer 14 fitted in it. A nozzle atomizer may, however, also be used instead of a rotating atomizer.

The cement slurry used for the cement productions is distributed between the supply line 4 to the rotating kiln and a line 16 which leads a quantity of the cement slurry to the spray drying plant 12.

The discharge pipe 5 for the exhaust gas from the kiln likewise leads to the spray drying plant 12 where the exhaust gas is used as drying gas for the cement slurry supplied.

The powder discharge 17 of the spray drying plant 12 is connected to the supply line 11 to the powder supply means, so that the dry powdered product is introduced into the kiln in the transition between the drying zone 2 and the calcining zone 3.

It should be pointed out here that in the case of a kiln like that shown in FIG. 1 there is no well-defined dividing line between the two zones, and the transition between them in this case means the last part of the drying zone 2 and the first part of the calcining zone 3.

The exhaust gas is led from the spray drying plant 12 through a duct 18 to a dust separator 19 which may be of any suitable type, but in the case shown it is supposed constructed as an electrostatic two-stage separator with an outlet 20 for coarse dust, which is returned into the process, and an outlet 21 for fine dust as well as a gas discharge 22.

The return of coarse dust from the outlet 20 is in FIG. 1 effected by supply to a mixer 15, which is inserted in the line 16, but it may instead or simultaneously through a line 23, which is shown by a dotted line, be introduced into the powder from the drying chamber 13.

The alkalis from the gas will in the plant described substantially appear as fine dust which will consequently not be returned into the process, while the coarse dust returned has only a slight content of alkali.

In FIG. 1 has furthermore in dotted lines been indicated a powder preheater 24, by which the powder coming form the spray drying plant 12 is preheated by means of the exhaust gas which is led from the kiln through the line 5 to the drying chamber 13.

In the case of an increasing quantity of material in the burning and calcining zones of the kiln, an increasing supply of heat is required, and in the case of large quantities of material this may cause a temperature of the exhaust gas which is higher than is expedient for supply to the drying plant. By the use of the preheater 24, a certain cooling of the exhaust gas is obtained, and at the same time the preheating of the powder entails a reduction of theheat requirements in the rotating kiln.

By the use of a drying plant with a very great capacity it may, however, also occur that the temperature of the exhaust gas is insufficient, and in this case it is possible in the line 5 to insert a heating apparatus 24' as shown in dotted lines.

Figure 4:
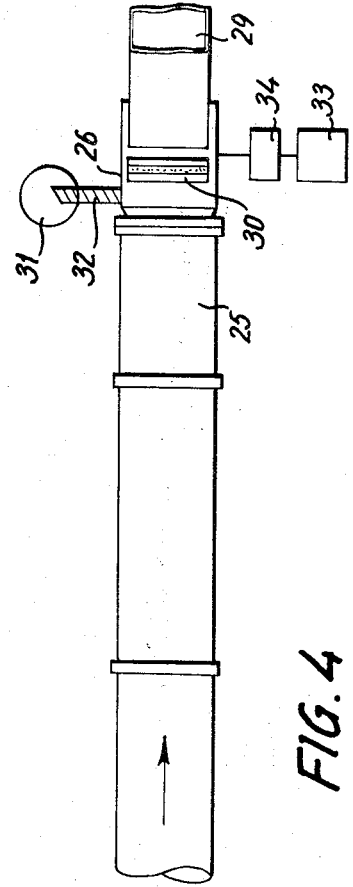

In FIGS. 3 and 4, the modified construction is shown of the part of the plant constituted by the kiln. In this case, the latter is of the type consisting of two sections coupled together, one of which, viz. the section 25, has the form of a rotating kiln and contains mainly the calcining zone and the burning zone, while the other consists of a known slurry drier 26 comprising a perforated drum 27 which is divided into a number of sections and filled with tubular cast iron bodies not shown. As will appear from FIG. 4, this drum 27 is driven by a motor 33 through a gear 34. This slurry drier 26 is through a connecting part 28 connected to the rotating section 25. The supply of slurry is effected through a chute 30, e.g. by means of nozzles which are not shown in the drawing, and the exhaust gas passes from the rotating section through the connecting part 28 and the drum 27 and from the latter further on through an exhaust gas discharge 29 which is connected to the spray drying plant 12 in FIG. 1 in the same manner as the exhaust gas discharge 5.

The powder from the spray drying plant 12 in FIG. 1 is led to a silo 31 in FIGS. 3 and 4 and from here through a conveyor 32 to the connecting part 28.

It should here be pointed out that in plants with several rotating kilns it is possible, if this be desired, to couple the drying gas inlet of the spray drying plant to the gas exhaust from one of the kilns and lead the powder obtained from the spray drying plant to another one of the kilns.

In the following, some examples of the application of the plant and the carrying out of the method will be given.

EXAMPLE 1.

In a conventional rotating kiln having a length of 130 m and a diameter of 3.8 m there was at normal operation produced 800 tons of clinker per 24 hours by the working up of 2,050 tons of cement slurry with a water content of 40 percent. The maximum temperature in the burning zone was about 2,100° C, while the temperature of the gas at the exhaust from the kiln was 320° C, which gave a heat consumption of 1,750 kcal per kg clinker.

After the addition of a spray drying plant in the way described above the capacity could be increased to 1,000 tons of clinker per 24 hours, 35 percent of the quantity of slurry corresponding hereto being dried in the spray drying plant, while the quantity of slurry introduced directly into the rotating kiln was reduced by about 19 percent compared to the quantity introduced at normal operation. The introduction of the material dried in the spray drying plant was effected at a distance of about 60 m from the upper end of the kiln at a gas temperature of 985° C. The temperature of the gas at the inlet to the spray drying plant was 475° C, while at the exhaust from the latter it had dropped to 130° C. While thus an increase of 25 percent of the capacity was achieved, the heat consumption was at the same time reduced to 1,450 kcal per kg clinker.

EXAMPLE 2.

In a conventional rotating kiln having a length of 52 mm and a diameter of 2.4 m there was at normal operation produced 107 tons of clinker per 24 hours. The specific heat consumption was 2,700 kcal per kg clinker produced. The exhaust temperature from the kiln was 670° C, and the heat content in the exhaust gas was utilized for the generation of steam. The cement slurry used had a water content of 35 percent.

By the addition of a spray drying plant in the way described above the capacity was increased to 185 tons of clinker per 24 hours, 75 percent of the increased quantity of cement slurry being dried in the spray drying plant, while the dried powder produced by this means was introduced about 15 m from the upper end of the kiln at a gas temperature of 872°, and only the remaining 25 percent was introduced in the usual manner at the upper end of the kiln. The inlet temperature to the spray drying plant was 725° C and the exhaust temperature 180° C. The heat consumption was by this means lowered to 1,485 kcal per kg clinker.

EXAMPLE 3.

In a conventional rotating kiln having a length of 60 m and a diameter of 2.8 m, cement slurry was used with a content of dry matter of 54 percent which was supplied at the upper end of the kiln through nozzles. At normal operation, 219 tons of clinker was produced per 24 hours. The exhaust temperature from the rotating kiln was 696° C, and the heat consumption was of 2,980 kcal per kg clinker.

The production was modified so that the cement slurry was dehydrated by mechanical means to a concentration of 72 percent, and 90 percent of the concentrated cement slurry was dried in a spray drying plant comprising a centrifugal atomizer with a wheel with wearresistant inserts. The dried powder produced in this way was supplied 10 m from the end of the kiln at a gas temperature of 640° C. By this means, the capacity of the plant was increased to 572 tons per 24 hours. The inlet temperature at the spray drying plant was 603° C and the exhaust temperature was 130° C, and the heat consumption became 1,150 kcal per kg clinker, i.e. a reduction to below half the original heat consumption.

EXAMPLE 4.

Exhaust gas from two rotating kilns, 80 m long, one with a diameter of 2.6 m, the other with a diameter of 3 m, was at a temperature of 315° C led to a spray drying plant which produced 9.2 tons of raw meal per hour (corresponding to 216 tons of raw meal per 24 hours or 144 tons of clinker per 24 hours) at an outlet temperature for the drying gas of 130° C and a content of dry matter in the slurry of 60 percent.

The raw meal from the spray drying plant was distributed evenly between two other rotating kiln plants, each with a capacity of 550 tons of clinker per 24 hours and a heat consumption of about 1,500 kcal per kg clinker. The rotating kiln plants both consisted of a slurry drying unit coupled to a rotating kiln unit as shown in FIG. 3, and the raw meal produced by the spray drying was introduced into the transition between the slurry drying unit and the rotating kiln unit. The supply of slurry to the two slurry drying units was kept constantly at the same value as before the connection of the spray drying plant.

The capacity of each of the rotating kiln units was increased by 72 tons of clinker per 24 hours at an additional heat consumption of 585 kcal per kg increased clinker production. At the same time the weight per litre of the clinkers rose from 1,440 to 1,600–1,650 kg per m³.

EXAMPLE 5.

In the same plant as described in Example 4, a booster oven was incorporated for increasing the temperature of the exhaust gases from 315° C to 600° C before the said gases were introduced into the spray drying plant. With the same outlet temperature for the drying gas as in Example 4, there was now by the spray drying produced 26 tons of raw meal per hour which was distributed evenly between the two rotating kiln plants. The quantity of slurry supplied to the latter was the same as before the connection of the spray drying plant.

The capacity of each of the rotating kiln plants was now increased by about 200 tons of clinker per 24 hours. The heat consumption in the booster oven was 8.25 million kcal per hour, and the additional consumption of oil for the burners in the rotating kilns was 100 kg per hour, corresponding to a total additional consumption of heat of about 18.2 million kcal per hour.

The heat consumption for the increase in the production thus amounted to 1,075 kcal per kg as compared with a normal consumption of heat of 1,450–1,550 kcal per kg clinker. Also in this case an increase in the weight per litre of the clinker was ascertained.

We claim:

1. A method of producing cement by a wet process in a rotating kiln plant having a heating means generating hot gases, a sintering zone adjacent the heating means, a calcining zone adjacent the sintering zone and a drying zone in the gas stream downstream of the calcining zone, comprising the steps of:
   a. introducing a first quantity of cement slurry into the kiln downstream of the drying zone in a counterflow relation to the gases;
   b. spray drying a second quantity of cement slurry by means of kiln exhaust gases;
   c. introducing the spray dried second quantity of cement slurry into the rotating kiln at a point in the gas stream upstream of the point of introduction of the first quantity of slurry; and
   d. separating cement dust from the kiln exhaust gases.

2. A method of producing cement as set forth in claim 1 wherein the first quantity of cement slurry introduced into the rotating kiln is 20–100 percent of the normal kiln plant capacity by weight and the sum of the first quantity and second quantity of cement slurry equals 120–300 percent of the normal kiln plant capacity by weight, said normal kiln plant capacity being the capacity of the kiln plant operating without spray drying and with a single point of introduction of cement slurry.

3. The method of producing cement as set forth in claim 1 further comprising the step of combining a course fraction of the separated cement dust with the dried second quantity of cement slurry prior to introduction into the kiln.

4. A method of producing cement as set forth in claim 1 further comprising the step of mixing a course fraction of the cement dust separated from the kiln exhaust gases with the second quantity of cement slurry prior to the spray drying of the second quantity.

5. A method of producing cement as set forth in claim 1 further comprising the step of mechanically dehydrating the second quantity of cement slurry to a dry matter content of up to 70–75 percent by weight prior to the spray drying and wherein the spray drying is preferably effected by using a rotary atomizer.

6. A method of producing cement as set forth in claim 1 further comprising the step of reheating the kiln exhaust gases prior to introduction of the second quantity of cement slurry.

7. A method of producing cement as set forth in claim 1, further comprising the step of pre-heating the dried second quantity of cement slurry by passing said dried second quantity in heat exchange relationship with the kiln exhaust gases upstream of the point of spray drying of said second quantity into said exhaust gases.

8. A method of producing cement as set forth in claim 1, wherein the point of introduction of the second quantity of cement slurry is between the calcining zone and drying zone of the kiln.

9. A method of producing cement as set forth in claim 1, further comprising using kiln exhaust gases obtained at least in part from a kiln other than the one into which the spray dried second quantity of cement slurry is introduced.

10. A rotary kiln plant for producing cement according to a wet process comprising, a rotating kiln having a hot gas producing firing means located at one end thereof, an exhaust gas passage means connected to the end of said kiln opposite said firing means, said rotating kiln having a sintering zone adjacent the firing means, a calcining zone adjacent the sintering zone and a drying zone adjacent the calcining zone at the other end of said kiln, a spray dryer connected to said exhaust gas passage means, said spray dryer including an atomizing means therein, a dust separating means, an exhaust gas duct communicating said spray dryer with said dust separating means, said spray dryer further including a powder discharge, an inelt conduit communicating said powder discharge with said rotating kiln between said calcining zone and said drying zone, cement slurry supply means, a first supply line connecting said supply means with said rotating kiln at the end opposite said firing means in counterflow relation to said hot gases and a second supply line connecting said supply means with said atomizing means of said spray dryer.

11. A rotating kiln plant as set forth in claim 10 further comprising heat exchange means connected between said inlet conduit and said exhaust gas passage means for preheating the dry cement powder prior to discharge into said rotating kiln.

12. A rotating kiln plant as set forth in claim 10 further comprising a coarse dust outlet in said dust separating means and a line connecting said coarse dust outlet with said inlet conduit.

13. A rotating kiln plant as set forth in claim 10 further comprising a coarse dust outlet in said dust separating means, mixing means connected in said second supply line between said cement slurry supply means and said spray dryer and a connecting line communicating said dust outlet with said mixing means, said mixing means being adapted to mix coarse cement dust separated from the exhaust gases by said dust separator with the cement slurry for conveyance into said atomizing means.

14. A rotating kiln plant as set forth in claim 10 further comprising heating means operatively connected to said exhaust gas passage means for reheating the exhaust gases prior to entry into said spray dryer.

* * * * *